US011133935B2

(12) United States Patent
Sloane (10) Patent No.: US 11,133,935 B2
(45) Date of Patent: Sep. 28, 2021

(54) SYSTEM FOR INTEGRITY VALIDATION OF AUTHORIZATION DATA USING CRYPTOGRAPHIC HASHES

(71) Applicant: Bank of America Corporation, Charlotte, NC (US)

(72) Inventor: Brandon Sloane, Santa Barbara, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 234 days.

(21) Appl. No.: 16/587,844

(22) Filed: Sep. 30, 2019

(65) Prior Publication Data

US 2021/0099306 A1    Apr. 1, 2021

(51) Int. Cl.
H04L 9/32    (2006.01)

(52) U.S. Cl.
CPC ........ H04L 9/3239 (2013.01); *H04L 2209/08* (2013.01)

(58) Field of Classification Search
CPC ... H04L 9/3226; H04L 9/3236; H04L 9/3239; H04L 9/3297; H04L 63/083; H04L 63/0838; H04L 63/0861; H04L 63/0867; H04L 2209/805
See application file for complete search history.

(56) References Cited

U.S. PATENT DOCUMENTS

| 5,317,528 | A | 5/1994 | Gofman |
| 6,778,066 | B2 | 8/2004 | Smith |
| 6,990,201 | B1 | 1/2006 | Coron et al. |
| 7,146,006 | B1 | 12/2006 | Coron et al. |
| 7,536,540 | B2 | 5/2009 | Holtzman et al. |
| 7,594,604 | B2 | 9/2009 | Haas |
| 7,743,409 | B2 | 6/2010 | Gonzalez et al. |
| 7,817,981 | B2 | 10/2010 | Coppinger et al. |
| 7,856,554 | B2 | 12/2010 | Lapstun et al. |
| 7,920,050 | B2 | 4/2011 | Juels et al. |
| 7,958,226 | B2 | 6/2011 | Bernardi et al. |
| 8,130,078 | B2 | 3/2012 | Tassy et al. |
| 8,296,841 | B2 | 10/2012 | Thom et al. |
| 8,726,021 | B2 | 5/2014 | Poovendran et al. |
| 9,077,543 | B2 | 7/2015 | Luft et al. |
| 9,218,476 | B1 | 12/2015 | Roth et al. |
| 9,369,461 | B1 * | 6/2016 | Roth .................... H04L 63/0838 |
| 9,935,789 | B2 | 4/2018 | Fausak et al. |
| 9,935,940 | B1 * | 4/2018 | DeMoss ................ G06F 16/951 |
| 9,972,147 | B1 | 5/2018 | Lee et al. |
| 2008/0290994 | A1 | 11/2008 | Bruns et al. |
| 2016/0358391 | A1 | 12/2016 | Drako et al. |
| 2017/0180985 | A1 | 6/2017 | Holleis |
| 2018/0041345 | A1 | 2/2018 | Maim |

\* cited by examiner

*Primary Examiner* — Minh Dinh
(74) *Attorney, Agent, or Firm* — Michael A. Springs; Moore & Van Allen PLLC; Seongun M. Hong (57) ABSTRACT

A system provides integrity validation of authorization codes using cryptographic hashes. In particular, the system may use various types of input data to generate a randomized hash value which may be associated with a user, device, or set of data (e.g., an authorization code). For instance, the input data may include historical log data, location and/or geolocation data, contextual data, salt values, or the like. In this way, the system may generate a hash value that is randomized while adding meaning that is unique to the user, device, or data with which the randomized hash value is associated.

20 Claims, 3 Drawing Sheets

SYSTEM FOR INTEGRITY VALIDATION OF AUTHORIZATION DATA USING CRYPTOGRAPHIC HASHES

FIELD OF THE INVENTION

The present disclosure embraces a system for integrity validation of authorization codes using cryptographic hashes.

BACKGROUND

There is a need for a secure way to perform integrity validation of authorization data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for integrity validation of authorization codes using cryptographic hashes. In particular, the system may use various types of input data to generate a randomized hash value which may be associated with a user, device, or set of data (e.g., an authorization code). For instance, the input data may include historical log data, location and/or geolocation data, contextual data, salt values, or the like. In this way, the system may generate a hash value that is randomized while adding meaning that is unique to the user, device, or data with which the randomized hash value is associated.

Accordingly, embodiments of the present disclosure provide a system for integrity validation of authorization codes using cryptographic hashes. The system may comprise a memory device with computer-readable program code stored thereon; a communication device; and a processing device operatively coupled to the memory device and the communication device. The processing device may be configured to execute the computer-readable program code to receive an authorization code from an authorization device; access historical log data associated with the authorization code; input the authorization code, the historical log data, and additional identifier data into a hash algorithm to generate a hash output; perform one or more operations on the hash output to generate a randomized hash value; and store the randomized hash value in an integrity validation database.

In some embodiments, the computer-readable program code further causes the processing device to perform integrity validation of the randomized hash value, wherein performing the integrity validation comprises retrieving the authorization code, the historical log data, and the additional identifier data; inputting the authorization code, the historical log data, and the additional identifier data into the hash algorithm to generate a second hash output; performing the one or more operations on the second hash output to generate a second randomized hash value; retrieving the randomized hash value from the integrity validation database; and comparing the randomized hash value with the second randomized hash value.

In some embodiments, the computer-readable program code further causes the processing device to detect that the randomized hash value matches the second randomized hash value; and determine that the integrity validation of the randomized hash value has been performed successfully.

In some embodiments, the computer-readable program code further causes the processing device to detect that the randomized hash value does not match the second randomized hash value; and determine that the integrity validation of the randomized hash value has failed.

In some embodiments, generating the hash output further comprises inputting one or more salt values into the hash algorithm.

In some embodiments, the additional identifier data comprises at least one of timestamp data, location data, or contextual data.

In some embodiments, the one or more operations comprises a XOR operation.

Embodiments of the present disclosure also provide a computer program product for integrity validation of authorization codes using cryptographic hashes. The computer program product may comprise at least one non-transitory computer readable medium having computer-readable program code portions embodied therein, the computer-readable program code portions comprising executable code portions for receiving an authorization code from an authorization device; accessing historical log data associated with the authorization code; inputting the authorization code, the historical log data, and additional identifier data into a hash algorithm to generate a hash output; performing one or more operations on the hash output to generate a randomized hash value; and storing the randomized hash value in an integrity validation database.

In some embodiments, the computer-readable program code portions further comprise executable code portions for performing integrity validation of the randomized hash value, wherein performing the integrity validation comprises retrieving the authorization code, the historical log data, and the additional identifier data; inputting the authorization code, the historical log data, and the additional identifier data into the hash algorithm to generate a second hash output; performing the one or more operations on the second hash output to generate a second randomized hash value; retrieving the randomized hash value from the integrity validation database; and comparing the randomized hash value with the second randomized hash value.

In some embodiments, the computer-readable program code portions further comprise executable code portions for detecting that the randomized hash value matches the second randomized hash value; and determining that the integrity validation of the randomized hash value has been performed successfully.

In some embodiments, the computer-readable program code portions further comprise executable code portions for detecting that the randomized hash value does not match the second randomized hash value; and determining that the integrity validation of the randomized hash value has failed.

In some embodiments, generating the hash output further comprises inputting one or more salt values into the hash algorithm.

In some embodiments, the additional identifier data comprises at least one of timestamp data, location data, or contextual data.

Embodiments of the present disclosure also provide a computer-implemented method for integrity validation of authorization codes using cryptographic hashes. The method may comprise receiving an authorization code from an authorization device; accessing historical log data associated with the authorization code; inputting the authorization code, the historical log data, and additional identifier data into a hash algorithm to generate a hash output; performing one or more operations on the hash output to generate a randomized hash value; and storing the randomized hash value in an integrity validation database.

In some embodiments, the method further comprises performing integrity validation of the randomized hash value, wherein performing the integrity validation comprises retrieving the authorization code, the historical log data, and the additional identifier data; inputting the authorization code, the historical log data, and the additional identifier data into the hash algorithm to generate a second hash output; performing the one or more operations on the second hash output to generate a second randomized hash value; retrieving the randomized hash value from the integrity validation database; and comparing the randomized hash value with the second randomized hash value.

In some embodiments, the method further comprises detecting that the randomized hash value matches the second randomized hash value; and determining that the integrity validation of the randomized hash value has been performed successfully.

In some embodiments, the method further comprises detecting that the randomized hash value does not match the second randomized hash value; and determining that the integrity validation of the randomized hash value has failed.

In some embodiments, generating the hash output further comprises inputting one or more salt values into the hash algorithm.

In some embodiments, the additional identifier data comprises at least one of timestamp data, location data, or contextual data.

In some embodiments, the one or more operations comprises a XOR operation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects or assets used to accomplish the entity's objectives. In this regard, "resource" may refer to data, secured locations within the entity's premises, applications, computing resources (e.g., processing power, memory space, or the like), or the like.

An entity may use various types of access control mechanisms to provide selective, authorized and authenticated access to its resources. For example, resources such as secured facilities may be protected by access control mechanisms such as electronic door locks which are unlockable using authentication credentials (e.g., electronic ID or badge, biometrics, PIN, authorization numbers or codes, or the like). Other resources, such as online data or applications, may be protected by access control mechanisms such as a username/password requirement, secure token, biometric identification, or the like. In this regard, an entity system may comprise a database comprising historical logs containing information about the resources accessed within the entity system (e.g., the specific resources accessed, the access control mechanisms associated with the specific resources, the location of the resources, the authentication credentials used to access the resources, the user associated with the authentication credentials, the time/interval in which the resource was accessed, and the like). Based on the information within the historical log and/or other types of data/metadata regarding the resource and/or the access control mechanism, the system may compute nonce values on a per user or per resource basis (e.g., via a hash algorithm). The system may then transform the nonce value to generate new authentication credentials. In some embodiments, the system may subsequently invalidate the old authentication credentials such that the new authentication credentials must be provided to access a particular resource.

An exemplary use case is provided below for illustrative purposes. In one embodiment, an entity may secure facilities or restricted areas (e.g., a server room) using card reader technology (e.g., a radio-frequency identification or "RFID" scanner) such that the restricted areas may only be accessed using authorized access cards (e.g., RFID cards or badges). In such embodiments, the access card may be associated with a unique authorization number which may be stored within a card access database and/or within the card itself. Additionally, data and metadata associated with the access card may be stored within the historical database (e.g., the unique authorization number, the user associated with the access card, the locations accessed using the card, the number of times each location was accessed using the access cards, timestamps of access card uses, and the like). Upon detecting that an access card has been used to access a facility, the system may generate a new authorization number for the access card.

For instance, the system may input various types of data and/or metadata (e.g., the authorization number, timestamps associated with the access card, location data, and/or other information as described above) along with a nonce value (e.g., a number that is used just once) into a hash algorithm to generate an authorization hash output, which may be a fixed-length numerical string. The authorization hash output may then be transformed using one or more processes (e.g., a logic gate such as XOR operation) the new authorization number, which may then be written to the card and/or stored within the card access database. Thereafter, the entity system may reject authentication attempts using the old authorization number; only the new authorization number will be validated by the system. In some embodiments, a new authorization number may be generated upon each use of the access card such that new authorization numbers are continually generated as the access card is used within the network environment. Accordingly, an original access card which ceases to be authenticated within the system may indicate that the original access card has been compromised (e.g., a duplicate of the access card has been created).

In some embodiments, the system may use additional inputs (e.g., salt values) to the hash algorithm to further ensure uniqueness of the hash output. For example, the system may use unique information associated with the user and/or the resources, such as biometric identifiers, behavior data, geolocation, contextual data, or the like, as additional salt values for the hash function. Accordingly, the method as described above may be used to add integrity checking functionality to the random generation of hash outputs. For instance, in the application update context, an application update may be associated with a particular unique identifying signature (e.g., a character string or hash). The signature associated with the application update, along with additional data (e.g., a historical log of application updates) may be used as salt values with the hash algorithm. In this way, the output hash reflects not only the most recent update, but also the history of previously deployed updates. In such embodiments, if both the upstream and downstream computing systems have access to the application update logs, both systems may be able to perform the hash calculation (e.g., calculating a hash output using salt values) to perform an integrity check for each update deployed, thereby enabling a two-way handshake mechanism to verify integrity of authorization values and/or data.

The system as described herein confers a number of technological advantages over conventional authorization systems. For instance, generating new authentication credentials based on salt values (e.g., historical log data associated with the authentication credentials), the opportunity for unauthorized access to an entity's resources (e.g., time window in which unauthorized access may be gained, the number of times unauthorized access may be granted, or the like) may be greatly reduced, thereby increasing the security of the networked system. Furthermore, in embodiments in which the new authentication credentials are generated based on the history of access, the system may provide integrity checking functionality to the authorization process.

Figure 1:
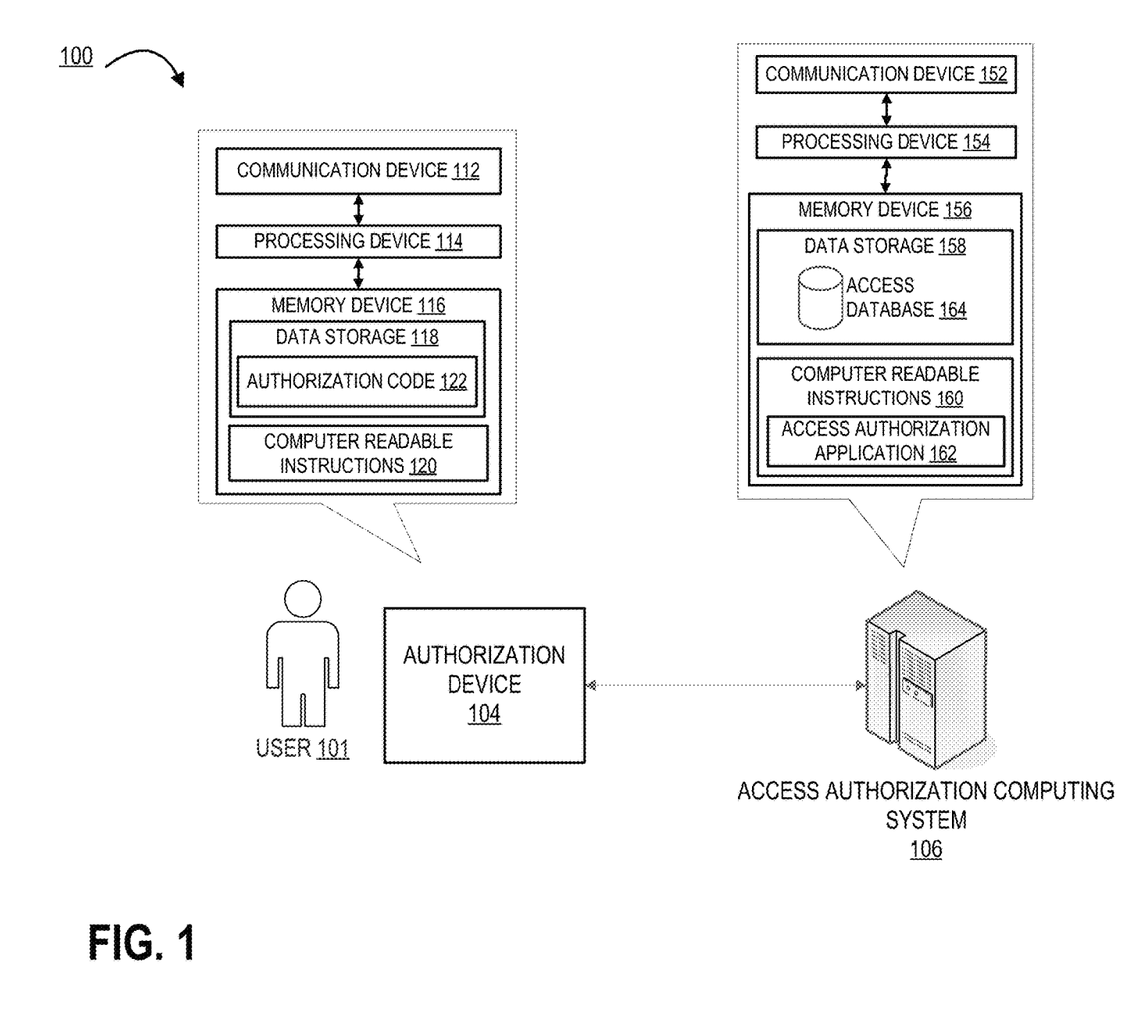
FIG. 1 illustrates an operating environment for the access authorization system, in accordance with one embodiment of the present disclosure.

Turning now to the figures, FIG. 1 illustrates an operating environment 100 for the access authorization system, in accordance with one embodiment of the present disclosure. In particular, FIG. 1 illustrates a mutable database computing system 106 that is operatively coupled, via a network, to an authorization device 104. In such a configuration, the access authorization computing system 106 may, in some embodiments, transmit information to and/or receive information from the authorization device 104. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the authorization device 104 is depicted as a single unit, the system may comprise multiple authorization devices 104 that may be used independently from one another to authorize users to access the entity's resources.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the access authorization computing system 106 may be a computing system that performs authorization and/or authentication functions to provide secured access to an entity's resources. Accordingly, the access authorization computing system 106 may comprise a communication device 152, a processing device 154, and a memory device 156. The access authorization computing system 106 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the authorization device 104 and/or the second entity computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a access authorization application 162 which allows the entity system to perform the secured access authorization functions as described elsewhere herein. In some embodiments, the memory device 156 includes data storage 158 for storing data related to the system environment. In this regard, the data storage 158 may comprise a access database 164, which may include various types of data used by the entity. In particular, the access database 164 may comprise data used to authorize and/or authenticate users and/or applications. For instance, the access database 164 may comprise a historical log of information related to the authorization of users, devices, and/or application within the information, such as authorization codes, protected resources, records of authorization attempts and/or outcomes, locations of authorization activity, timestamps or timeframes of the authorization attempts, or the like.

The access authorization application 162 may comprise computer-executable program code which may instruct the processing device 154 to perform certain logic, data processing, and data storing functions of the application to accomplish the entity's objectives. For instance, the access authorization application 162 may, based at least partially on the information within the access database 164, generate new authorization codes. In particular, the access authorization application 162 may generate a new authorization code each time an authorization code is used to access a resource by executing a hash algorithm with the historical log data, the old authorization code, and/or other types of data as inputs. The access authorization application 162 may further perform additional operations on the hash algorithm output (e.g., logical operations) as described elsewhere herein.

As further illustrated in FIG. 1, the authorization device 104 may be a device which enables a user 101 to gain authorized access to the entity's resources. In this regard, the authorization device 104 may be an access card such as an RFID badge, wireless keycard, NFC card, magnetic keycard, or the like, though it is within the scope of the disclosure for the authorization device 104 to be a portable device such as a cellular phone, smart phone, smart device, personal data assistant (PDA), laptop, or the like, which may be operated by the user 101. In this regard, in some embodiments, the authorization device 104 may be operatively coupled to the access authorization computing system 106 through one or more intermediary authorization systems (e.g., RFID reader, keycard readers, NFC scanners, biometric readers, or other devices which may receive authorization data from the authorization device 104). The authorization device 104 generally comprises a communication device 112, a processing device 114, and a memory device 116, where the processing device 114 is operatively coupled to the communication device 112 and the memory device 116. The processing device 114 uses the communication device 112 to communicate with the network and other devices on the network, such as, but not limited to the access authorization computing system 106 and/or the second entity computing system 103. As such, the communication device 112 generally comprises a modem, antennae, WiFi or Ethernet adapter, radio transceiver, or other device for communicating with other devices on the network.

The authorization device 104 comprises computer-readable instructions 120 and data storage 118 stored in the memory device 116, which in one embodiment includes computer-readable instructions 120. The data storage 118 may comprise an authorization code 122, which in some embodiments may be a string of characters (e.g., an alphanumeric string). When the authorization device 122 is used to gain authorized access to a resource (e.g., an RFID badge is scanned by an RFID reader), the authorization code 122 may be transmitted (e.g., via an intermediary such as the RFID reader) to the access authorization computing system 106, where the authorization code 122 may be validated with the authorization code stored within the access authorization computing system 106. If the authorization codes match, the authorization code 122 may be considered valid and the system may subsequently grant access to the resource. In some embodiments, when a new authorization code is generated by the access authorization computing system 106, the new authorization code may be written to the data storage 118 (e.g., by overwriting the authorization code 122).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the second entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a second user 102, may include any of a number of devices allowing the devices to receive data from a second user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
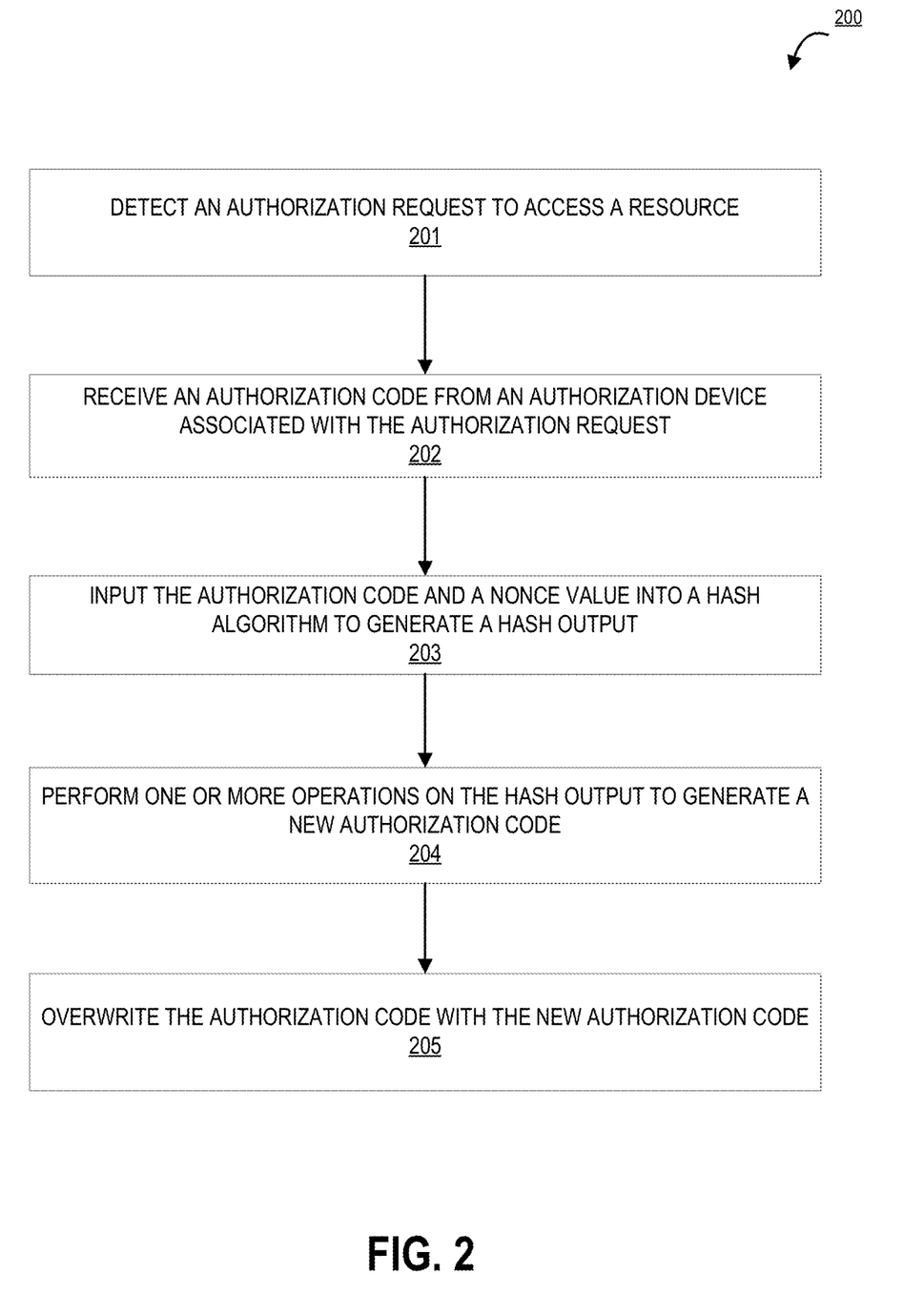
FIG. 2 illustrates a process flow for the access authorization system, in accordance with one embodiment of the present disclosure.

FIG. 2 illustrates a process flow 200 for the mutable database system, in accordance with some embodiments of the present disclosure. The process 200 begins at block 201, where the system detects an authorization request to access a resource. The resource may be, for instance, a secured facility or location within the entity's premises, private or protected data, a device or other object within the control of the entity, or the like. In this regard, in some embodiments, the system may detect the authorization request via a security device for receiving authorization credentials, where the device may be an RFID/NFC scanner, fingerprint reader or other biometric scanner, barcode reader, magnetic card reader, or the like. In an exemplary embodiment, a user may place an RFID badge proximate to an RFID scanner to gain authorization to access a secured location within the entity's premises (e.g., a server room).

The process continues to block 202, where the system receives an authorization code from an authorization device associated with the authorization request. The authorization code may be a unique identifier associated with the authorization device (e.g., a contactless keycard such as an RFID/NFC card, mobile phone, magnetic access card, or the like) and/or a user. Accordingly, the authorization code may be a numerical value (e.g., a serial number or identification number), alphanumeric string, character string, matrix, or other type of data which is unique to the authorization device and/or the user. Once the system receives the authorization code, the system may perform a validation check on the received authorization code. In some embodiments, the received authorization code may be compared with one or more entries in an authorization database, where said database comprises a list of valid authorization codes. The system may further perform additional validation checks based on the access request, such as the resource to be accessed, the location of the access request, the status of the user associated with the access request and/or the authorization device, and/or the like. If the validation check is successful, the system may grant access to the resource. On the other hand, if the validation check fails, the system may block access to the resource until the validation check may be successfully completed.

Continuing the above example, the system may receive the authorization code from the RFID badge via an RFID scanner. The system may then verify that the authorization code from the RFID badge is a valid authorization code (e.g., by checking a database of valid authorization codes). The system may further perform additional validation checks, such as whether the authorization code received from the RFID badge is valid for the resource being accessed, that the user associated with the authorization code is authorized to access the resource (e.g., system administrators are authorized to access the server room), and the like. If the authorization code from the RFID badge passes the validation checks, the system may grant access to the resource and move on to the next step in the process. That said, if the authorization code fails the validation checks, the system may deny access to the resource.

The process continues to block 203, where the system inputs the authorization code and a nonce value into a hash algorithm to generate a hash output. The hash algorithm may be a cryptographic function that converts input data into a fixed-length character output (e.g., an alphanumeric string). Accordingly, the system may, upon validating the authorization code, begin the process of generating a new authorization code. In this regard, the system may input various types of data along with the authorization code into the hash algorithm to generate a hash output (e.g., a cryptographic hash). For example, the various types of data may include a historical log of authorized access associated with the authorization code and/or the authorization device, location data (e.g., the location of the authorization device and/or the resource to be accessed), contextual data, behavior patterns, geolocation data, timestamps and/or timeframe data, salt values (e.g., user or authorization device ID number, values generated using biometric identifiers, or the like), and the like. In this way, the system may add randomization to the old authorization code to prevent potentially unauthorized users from discovering the new authorization code while simultaneously adding context and/or uniqueness such that the code reflects the history and/or metadata associated with the authorization code.

Continuing the above example regarding RFID badges, the system may input the authorization code associated with the RFID badge into a hash algorithm along with a nonce value and/or historical log data associated with the RFID badge and/or authorization code (e.g., resources accessed using the RFID badge, timestamps/timeframes of access, the identity and/or history of users associated with the RFID badge, physical locations accessed by the RFID badge, salt value, or the like).

In another illustrative embodiment, the system may include hash outputs for integrity validation of software updates. For instance, an upstream developer or systems administrator may push software updates to multiple downstream computing systems within the networked environment. Each software update may comprise a hash output value which may be computed based on the historical log data of software updates, timestamps, contextual data, salt values, or the like. Provided that both the upstream and downstream have access to the input data, the hash algorithm used, and the expected hash output, the upstream and downstream computing systems may perform integrity validation of the software update by inputting the above types of data into the specified hash algorithm to verify whether the calculated hash output matches the expected hash output as provided with the software update.

The process continues to block 204, where the system performs one or more operations on the hash output to generate a new authorization code. The system may transform the hash output using various types of logical and/or mathematical operations. In some embodiments, the system may perform a XOR operation on the hash output to generate the new authorization code, though it is within the scope of the disclosure for the one or more operations to comprise processing the hash output through other types of logic gates. Furthermore, the one or more operations may comprise inputting the hash output into one or more subsequent hash algorithms (e.g., a second hash algorithm) to generate the new authorization code. Once the new authorization code has been generated, the system may automatically invalidate the old authorization code such that only the new authorization code will be accepted in subsequent authorization attempts.

The process concludes at block 205, where the system overwrites the authorization code with the new authorization code. In some embodiments, the authorization code may be stored within the authorization device. Accordingly, the system may erase the authorization code from the memory of the authorization device and subsequently store the new authorization code in the memory of the authorization device. Additionally or alternatively, the system may update the authorization database with the new authorization code.

Continuing the above example, once the new authorization code is generated for the RFID badge, the old authorization code may no longer be accepted by the system to granted access to the entity's resources. For instance, the system may detect that an authorization device associated with the old authorization code has been used in an authorization request. The system may then attempt to validate the old authorization code using the authorization database. In such an embodiment, the system may detect that the old authorization code does not match the authorization code currently associated with the RFID badge (e.g., the new authorization code generated by the process described above). The system may then reject the authorization attempt which used the old authorization code. Accordingly, in the event that an unauthorized user has gained access to an authorization device which is associated with the old authorization code (e.g., by copying or cloning an existing RFID badge), the system may be able to detect that such a compromise has occurred. In some embodiments, the system may further be configured to send electronic alerts to one or more users (e.g., administrators) via the computing systems associated with the one or more users. In this way, the system may continuously generate new randomized authorization codes that also have elements of uniqueness to the users and/or authorization devices with which the authorization codes are associated.

Figure 3:
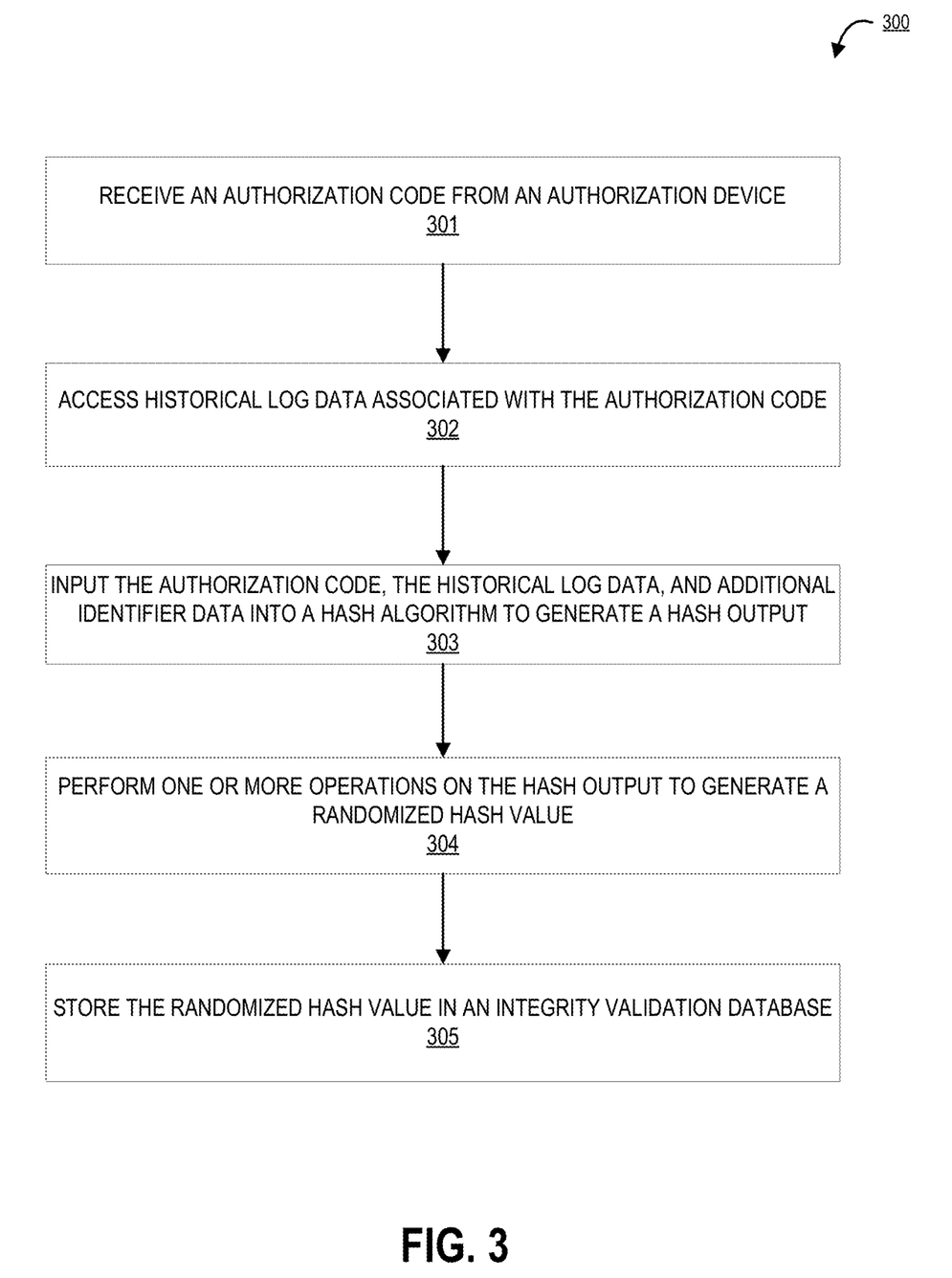
FIG. 3 illustrates a process flow for performing integrity validation of authorization codes, in accordance with one embodiment of the present disclosure.

FIG. 3 illustrates a process flow for performing integrity validation of authorization codes, in accordance with one embodiment of the present disclosure. The process begins at block 301, where the system receives an authorization code from an authorization device. The authorization code may be, for instance, a randomized password to be used in authenticating users. In other embodiments, the authorization code may be a hash of computer code (e.g., the hash of a software update to be deployed within the network environment).

The process continues to block 302, where the system accesses historical log data associated with the authorization code. As described above, the historical log data may include various types of information regarding the authorization code, such as the history of use or access, timestamps/ timeframes in which the authorization code was used, the locations/applications with which the authorization code was used, or the like. The historical log data may be stored on the authorization device itself and/or a separate database (e.g., an integrity validation database).

The process continues to block 303, where the system inputs the authorization code, the historical log data, and additional identifier data into a hash algorithm to generate a hash output. The additional identifier data may be information that identifies or otherwise relates to the authorization code and/or the authorization device, such as contextual data, geolocation data, or the like. In some embodiments, the system may further input salt values into the hash algorithm, where the salt values may include data such as biometric information (e.g., fingerprint data), user or device ID numbers (e.g., registration numbers, hardware serial numbers, or the like), or the like. In this way, the system may add additional elements of randomness while simultaneously ensuring uniqueness of the authorization code to a particular user or authorization device.

The process continues to block 304, where the system performs one or more operations on the hash output to generate a randomized hash value. As described above, the one or more operations may include logical or mathematical operations, such as a XOR operation. Once the randomized hash value is generated, the randomized hash value may subsequently be used to validate the integrity of the input data (e.g., the authorization code, salt values, historical log data, additional identifier data, or the like). In an exemplary embodiment, the system may generate randomized hashes to control access to a secured location (e.g., a server room). Provided that the randomized hash value reflects the access log of the server room (e.g., the access log within the historical data was inputted into the hash algorithm), the randomized hash value can be used to verify the integrity of the access log.

The process concludes at block 305, where the system stores the randomized hash value in an integrity validation database. The integrity validation database may be hosted, for instance, on an external server. Subsequent to the generation and storage of the randomized hash value, other users and/or computing systems may perform integrity validation of the authorization code, historical log data, salt values, and other such values by inputting the values into the hash algorithm and performing the one or more operations to attempt to reproduce the randomized hash value. If the calculated randomized hash value matches the randomized hash value previously generated by the system, the integrity validation check has succeeded (e.g., the authorization code, historical log data, and the like have not been compromised). On the other hand, if the randomized hash values do not match, the integrity validation check has failed (e.g., the input data has been compromised).

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for integrity validation of authorization codes using cryptographic hashes, the system comprising:
    a memory device with computer-readable program code stored thereon;
    a communication device; and
    a processing device operatively coupled to the memory device and the communication device, wherein the processing device is configured to execute the computer-readable program code to:
        receive an authorization code from an authorization device;
        access historical log data associated with the authorization code;
        input the authorization code, the historical log data, and additional identifier data into a hash algorithm to generate a hash output;
        perform one or more operations on the hash output to generate a randomized hash value; and
        store the randomized hash value in an integrity validation database.

2. The system according to claim 1, wherein the computer-readable program code further causes the processing device to perform integrity validation of the randomized hash value, wherein performing the integrity validation comprises:
    retrieving the authorization code, the historical log data, and the additional identifier data;
    inputting the authorization code, the historical log data, and the additional identifier data into the hash algorithm to generate a second hash output;
    performing the one or more operations on the second hash output to generate a second randomized hash value;
    retrieving the randomized hash value from the integrity validation database; and
    comparing the randomized hash value with the second randomized hash value.

3. The system according to claim 2, wherein the computer-readable program code further causes the processing device to:
  detect that the randomized hash value matches the second randomized hash value; and
  determine that the integrity validation of the randomized hash value has been performed successfully.

4. The system according to claim 2, wherein the computer-readable program code further causes the processing device to:
  detect that the randomized hash value does not match the second randomized hash value; and
  determine that the integrity validation of the randomized hash value has failed.

5. The system according to claim 1, wherein generating the hash output further comprises inputting one or more salt values into the hash algorithm.

6. The system according to claim 1, wherein the additional identifier data comprises at least one of timestamp data, location data, or contextual data.

7. The system according to claim 1, wherein the one or more operations comprises a XOR operation.

8. A computer program product for integrity validation of authorization codes using cryptographic hashes, the computer program product comprising at least one non-transitory computer readable medium having computer-readable program code portions embodied therein, the computer-readable program code portions comprising executable code portions for:
  receiving an authorization code from an authorization device;
  accessing historical log data associated with the authorization code;
  inputting the authorization code, the historical log data, and additional identifier data into a hash algorithm to generate a hash output;
  performing one or more operations on the hash output to generate a randomized hash value; and
  storing the randomized hash value in an integrity validation database.

9. The computer program product according to claim 8, wherein the computer-readable program code portions further comprise executable code portions for performing integrity validation of the randomized hash value, wherein performing the integrity validation comprises:
  retrieving the authorization code, the historical log data, and the additional identifier data;
  inputting the authorization code, the historical log data, and the additional identifier data into the hash algorithm to generate a second hash output;
  performing the one or more operations on the second hash output to generate a second randomized hash value;
  retrieving the randomized hash value from the integrity validation database; and
  comparing the randomized hash value with the second randomized hash value.

10. The computer program product according to claim 9, wherein the computer-readable program code portions further comprise executable code portions for:
  detecting that the randomized hash value matches the second randomized hash value; and
  determining that the integrity validation of the randomized hash value has been performed successfully.

11. The computer program product according to claim 9, wherein the computer-readable program code portions further comprise executable code portions for:
  detecting that the randomized hash value does not match the second randomized hash value; and
  determining that the integrity validation of the randomized hash value has failed.

12. The computer program product according to claim 8, wherein generating the hash output further comprises inputting one or more salt values into the hash algorithm.

13. The computer program product according to claim 8, wherein the additional identifier data comprises at least one of timestamp data, location data, or contextual data.

14. A computer-implemented method for integrity validation of authorization codes using cryptographic hashes, wherein the method comprises:
  receiving an authorization code from an authorization device;
  accessing historical log data associated with the authorization code;
  inputting the authorization code, the historical log data, and additional identifier data into a hash algorithm to generate a hash output;
  performing one or more operations on the hash output to generate a randomized hash value; and
  storing the randomized hash value in an integrity validation database.

15. The computer-implemented method according to claim 14, the method further comprising performing integrity validation of the randomized hash value, wherein performing the integrity validation comprises:
  retrieving the authorization code, the historical log data, and the additional identifier data;
  inputting the authorization code, the historical log data, and the additional identifier data into the hash algorithm to generate a second hash output;
  performing the one or more operations on the second hash output to generate a second randomized hash value;
  retrieving the randomized hash value from the integrity validation database; and
  comparing the randomized hash value with the second randomized hash value.

16. The computer-implemented method according to claim 15, the method further comprising:
  detecting that the randomized hash value matches the second randomized hash value; and
  determining that the integrity validation of the randomized hash value has been performed successfully.

17. The computer-implemented method according to claim 15, the method further comprising:
  detecting that the randomized hash value does not match the second randomized hash value; and
  determining that the integrity validation of the randomized hash value has failed.

18. The computer-implemented method according to claim 14, wherein generating the hash output further comprises inputting one or more salt values into the hash algorithm.

19. The computer-implemented method according to claim 14, wherein the additional identifier data comprises at least one of timestamp data, location data, or contextual data.

20. The computer-implemented method according to claim 14, wherein the one or more operations comprises a XOR operation.

* * * * *